United States Patent [19]

Lundberg et al.

[11] 4,259,284
[45] Mar. 31, 1981

[54] PROCESS FOR SPINNING FIBERS OF IONIC THERMOPLASTIC POLYMERS

[75] Inventors: Robert D. Lundberg, Bridgewater; Henry S. Makowski, Scotch Plains, both of N.J.

[73] Assignee: Exxon Research & Engineering Co., Florham Park, N.J.

[21] Appl. No.: 12,114

[22] Filed: Feb. 14, 1979

Related U.S. Application Data

[62] Division of Ser. No. 855,550, Nov. 29, 1977, Pat. No. 4,172,820.

[51] Int. Cl.$^3$ ............................................. D01F 6/00
[52] U.S. Cl. .................................. 264/184; 264/205; 264/211
[58] Field of Search ................. 260/33.6 AQ, 33.4 R, 260/DIG. 31, 23 S; 526/30, 31; 264/184, 204, 205; 521/28, 29, 33, 37, 38

[56] References Cited

U.S. PATENT DOCUMENTS

| | | | |
|---|---|---|---|
| 3,801,531 | 4/1974 | Berejka et al. | 260/33.4 PQ |
| 3,842,154 | 10/1974 | Lundberg et al. | 264/294 |
| 3,847,854 | 11/1974 | Canter et al. | 260/23 S |
| 3,852,096 | 12/1974 | Lundberg et al. | 260/31.8 M |
| 3,867,247 | 2/1975 | Farrell et al. | 260/33.6 |
| 4,051,217 | 9/1977 | Lundberg et al. | 264/230 |
| 4,053,548 | 10/1977 | Lundberg et al. | 264/230 |

FOREIGN PATENT DOCUMENTS 2345 6/1979 European Pat. Off. ................. 264/184

*Primary Examiner*—Jay H. Woo
*Attorney, Agent, or Firm*—Richard E. Nanfeldt

[57] ABSTRACT

The present invention relates to an improved process for forming fibers for fabrics from neutralized sulfonated thermoplastic polymers, and novel ionic polymer fiber compositions derived therefrom, wherein the neutralized sulfonated thermoplastic polymer is dissolved in a solvent, preferably a mixed solvent, consisting of a backbone solvent and a polar cosolvent and spun into fibers. The neutralized sulfonated thermoplastic polymer has about 10 to about 100 meq. SO$_3$H per 100 grams of sulfonated thermoplastic polymer, of which at least 95% is neutralized with a cation being selected from the group consisting essentially of antimony, iron, lead, aluminum, or Groups I-A, II-A, I-B or II-B of the Periodic Table of Elements and mixture thereof. The solution of the neutralized sulfonated thermoplastic polymer having a Brookfield viscosity at room temperature at about 6 rpm of about 1,000 to about 200,000 cps is fabricated into fibers by wet or dry spinning through a spinner having a plurality of orifices therein. The resultant fibers exhibit improved dimensional stability and resistance to solvents and temperature when fabricated into a fabric.

4 Claims, No Drawings

PROCESS FOR SPINNING FIBERS OF IONIC THERMOPLASTIC POLYMERS

This is a division of application Ser. No. 855,550, filed Nov. 29, 1977, now U.S. Pat. No. 4,172,820.

BACKGROUND OF THE INVENTION

1. Field of the Invention

The present invention relates to novel ionic polymer fibers and an improved process for forming fibers for fabrics from neutralized sulfonated polymers, wherein the neutralized sulfonated thermoplastic polymer is dissolved in a mixed solvent consisting of a backbone solvent and a polar cosolvent and spun into fibers. The neutralized sulfonated thermoplastic polymer has about 10 to about 100 meq. $SO_3H$ per 100 grams of sulfonated thermoplastic polymer, of which at least 95% is neutralized with a cation being selected from the group consisting essentially of antimony, iron, lead, aluminum, or Groups I-A, II-A, I-B or II-B of the Periodic Table of Elements and mixtures thereof. The solution of the neutralized sulfonated thermoplastic polymer having a Brookfield viscosity at room temperature at 6 rpm of about 1,000 to about 200,000 cps is fabricated into fibers by wet or dry spinning through a spinner having a plurality of orifices therein. The resultant ionic polymer fibers exhibit improved dimensional stability and resistance to solvents and temperature when fabricated into a fabric.

2. Description of the Prior Art

A major growing industry over the past decade has been the employment of synthetic thermoplastic fibers in the manufacture of fabrics. Thermoplastic fibers are used primarily in clothing, carpet and similar applications. Recently, a new class of sulfonated thermoplastic polymers has been described in a number of U.S. Pat. Nos. 3,867,319; 3,870,841; 3,925,280; 3,939,242 and 3,947,387 herein incorporated by reference. These types of sulfonated thermoplastic polymers constitute the general class of the compositions of the present instant invention. The aforementioned patents fail to clearly recognize or even imply the use of these types of polymers in a solution form for the manufacture of improved fibers, but rather teach compositions of matter useful primarily in hot melt extrusion or molding type processes.

SUMMARY OF THE INVENTION

The present invention relates to the surprising discovery that unique and novel sulfonated ionic polymer fibers capable of high performance can be formed by an improved process.

Accordingly, it is an object of our present instant invention to provide unique and novel sulfonated thermoplastic polymers, wherein the resultant fibers have improved dimensional stability, improved resistance to temperature, and improved resistance to a broader class of solvents as compared to commercially available thermoplastic fibers such as polypropylenes or polyesters.

A further object of our present instant invention is to provide an improved process for the manufacturing of these sulfonated thermoplastic polymer fibers, wherein a substantial reduction in manufacturing cost is realized due to decrease in solvent cost as well as improved processability parameters during the fibers spinning operation.

A still further object of our present instant invention is to provide a polymer which can be readily reprocessed thereby substantially reducing production cost through the recycling of the scrap.

A still further object of our present invention is to provide sulfonated thermoplastic polymer which can be readily formed into fibers on conventionally designed fiber forming equipment.

GENERAL DESCRIPTION

This present invention relates to unique and novel sulfonated thermoplastic polymer fibers which are readily formable on conventionally designed fiber forming equipment by an improved process into high performance fibers having superior dimensional stability, improved resistance to temperature and good chemical resistance to a broad class of solvents.

The thermoplastic polymers of the present invention include generally polyvinylaromatic and polyolefinic type thermoplastics.

The polyvinylaromatic thermoplastics resins of the present invention are selected from the group consisting essentially of polystyrene-, poly-t-butyl-styrene, poly-chlorostyrene, poly-α-methylstyrene or co- or terpolymers of the aforementioned with acrylonitrile or vinyl toluene.

The polyvinylaromatic based thermoplastics suitable for use in the practice of the invention have a glass transition temperature from about 80° C. to about 150° C., more preferably about 90° C. to about 140° C. and most preferably about 90° C. to about 120° C. These polyvinylaromatic resins have a weight average molecular weight of about 5,000 to about 500,000, more preferably about 20,000 to about 350,000 and most preferably about 90,000 to about 300,000. These polyvinylaromatic thermoplastic resins can be prepared directly by any of the known polymerization processes. The term "thermoplastic" is used in its conventional sense to mean a substantially rigid (flexus modulus > 10,000 psi) material capable of retaining the ability to flow at elevated temperatures for relatively long times.

The preferred polyvinyl aromatic thermoplastic resin is a homopolymer of styrene having a number average molecular weight of about 180,000, and an intrinsic viscosity in toluene of about 0.8. These polymers are widely available commercially in large volume. A suitable material is Dow Polystyrene 666 which affords a suitable molecular weight.

The polyolefinic thermoplastic resins of the present invention include those which are based on the polymerization of such monomers as ethylene, propylene, 4-methyl-1-pentene and 1-butene. In order for these systems to be successfully employed in the present invention, copolymers of such monomers with a suitable diene (e.g., 5-ethylidene-2-norbornene (ENB)) or an aromatic based olefin (e.g. styrene) must be employed. For example, crystalline copolymers of ethylene with ENB can be prepared in a manner identical to that employed to prepare ethylene-propylene terpolymers (EPDM), but with little or no propylene present. When such copolymers are prepared with diene contents less than 10%, they can be highly crystalline and behave as thermoplastics. Despite the fact that these systems will always require some diene present, we shall refer to these materials as polyolefins. The same types of crystalline systems can be prepared with propylene/diene, butene-1/diene etc. In all cases these polymers are rigid plastic systems which can be sulfonated by the techniques described below.

In contrast with the solution behavior of the sulfonated polystyrene products, these crystalline polyolefins do not readily dissolve at ambient temperatures. The preferred solvents for such systems are aliphatic hydrocarbons such as heptane, decalin, xylene or decane at elevated temperatures such that the crystalline polymers are melted. Normally this requires temperatures of 70° to 100° C. Sulfonation reactions can be conducted under these conditions.

After sulfonation and neutralization these polymers will not normally dissolve in even these solvents but require modest amounts of polar cosolvents as described below. The important point is that some heat is required to achieve dissolution of crystalline polyolefins due to polymer crystallinity. Otherwise the same considerations applied to non-crystalline thermoplastics can be used with the polyolefin.

In carrying out the invention, the thermoplastic polymer is dissolved in a non-reactive solvent such as a chlorinated aromatic hydrocarbon, a cycloaliphatic hydrocarbon, an aliphatic hydrocarbon or a chlorinated aliphatic hydrocarbon such as chlorobenzene, cyclohexane, pentane, isopentane, cyclopentane, hexane, isohexane or heptane. The preferred solvents are aliphatic hydrocarbons. A sulfonating agent is added to the solution of the thermoplastic polymer and non-reactive solvent at a temperature of about $-10°$ C. to about $100°$ C. for a period of time of about 1 to about 60 minutes, more preferably at room temperature for about 5 to about 45 minutes, and most preferably about 15 to about 30 minutes. Typical sulfonating agents are described in U.S. Pat. Nos. 3,642,728 and 3,836,511, incorporated herein by reference. These sulfonating agents are selected from an acyl sulfate, a mixture of sulfuric acid and an acid anhydride, or a complex of a sulfur trioxide donor and a Lewis base containing oxygen, sulfur or phosphorous. Typical sulfur trioxide donors are $SO_3$, chlorosulfonic acid, fluorosulfonic acid, etc. Typical Lewis bases are: dioxane, tetrahydrofuran, triethylphosphate, or tetrahydrothiophene. The most preferred sulfonation agent for this invention is an acyl sulfate selected from the group consisting essentially of benzoyl, acetyl, propionyl or butyryl sulfate. The acyl sulfate can be formed in situ in the reaction medium or pregenerated before its addition to the reaction medium in a solvent or neat. A preferred acyl sulfate is acetyl sulfate.

It should be pointed out that neither the sulfonating agent nor the manner of sulfonation is critical, provided that the sulfonating method does not degrade or covalently crosslink the polymeric backbone. The reaction is quenched with an aliphatic alcohol being selected from methanol, ethanol, n-propanol or isopropanol, with an aromatic hydroxyl compound such as phenol, a cycloaliphatic alcohol such as a cyclohexanol or with water. The acid form of the sulfonated EPDM terpolymer has about 10 to about 100 meq. $SO_3H$ groups per 100 grams of terpolymer, more preferably about 15 to about 50, and most preferably about 20 to about 40. The meq. of $SO_3H/100$ grams of polymer is determined by both titration of the polymeric sulfonic acid and Dietert Sulfur analysis. In the titration of the sulfonic acid the polymer is dissolved in solvent consisting of 95 parts of toluene and 5 parts of methanol at a concentration level of 50 grams per liter of solvent. The acid form is titrated with ethanolic sodium hydroxide to an Alizarin Thymolphthalein endpoint.

The acid form of the sulfonated polymer is substantially gel-free (i.e. less than 5 wt. % of the total polymer is insoluble) and hydrolytically stable. Percent gel is measured by stirring a given weight of polymer in a solvent comprised of 95 toluene/5 methanol at a concentration of 50 g/liter for 24 hours, allowing the mixture to settle, withdrawing a weighed sample of the supernatant solution and evaporating to dryness.

Hydrolytically stable means that the acid function, in this case the sulfonic acid, will not be eliminated under neutral or slightly basic conditions to a neutral moiety which is incapable of being converted to a highly ionic functionality.

Neutralization of the acid form of the sulfonated polymer is done by the addition of a solution of a basic salt to the acid form of the sulfonated polymer dissolved in the mixture of the aliphatic alcohol and non-reactive solvent. The basic salt is dissolved in water, in an aliphatic alcohol, or in a binary solvent system consisting of water and an aliphatic alcohol. The counterion of the basic salt is selected from antimony, iron, aluminum, lead, or Groups I-A, II-A, I-B or II-B of the Periodic Table of Elements and mixtures thereof. The preferred cations are zinc, magnesium, barium, sodium, potassium, calcium and lead. The anion of the basic salt is selected from a carboxylic acid having from about 1 to about 4 carbon atoms, a carbonate, a hydroxide, or an alkoxide, and mixtures thereof. It is preferable to neutralize at least 95% of the acid groups, more preferably about 98%, most preferably 100%.

Useful examples of metal hydroxides are NaOH, KOH, LiOH, $Mg(OH)_2$ and $Ba(OH)_2$. The preferred neutralization agents are metal acetates. The most preferred neutralizing agent is zinc acetate.

The neutralization of the $SO_3H$ groups of the sulfonated polymers with an organic amine is also satisfactory. The neutralization with organic amines or ammonia leads to the formation of weak ionic bonds thereby resulting in fibers having different physical properties than those achieved with metal cations.

A means of characterizing the apparent molecular weight of a polymer involves the use of melt rheological measurements. For ionic polymers, this is the preferred method since solution techniques are different to interpret due to the complex nature of the ionic associations. Melt rheological measurements of apparent viscosity at a controlled temperature and shear rate can be used as a measure of apparent molecular weight of an ionic polymer. Although the exact relationship between melt viscosity and apparent molecular weight for these ionic systems is not known, for the purposes of this application, the relationship will be assumed to be one of direct proportionality. Thus, in comparing two materials, which are otherwise similar in composition, the one with the higher melt viscosity will be associated with the higher apparent molecular weight.

The melt viscosities of the systems described above can be determined by the use of an Instron Capillary Rheometer. Generally, because of the high viscosities encountered, the melt viscosity measurements are made at a temperature of 200° C. and at various shear rates corresponding to crosshead speeds from 0.005 in/min to 20 in/min. The apparent viscosity at 200° C. and at a shear rate of 0.73 $sec^{-1}$ (0.005 in/min) can be employed as a characterization parameter. A measure of the melt elasticity of a given system can also be obtained from these rheological measurements. A type of flow instability known as melt fracture is exhibited by many polymeric materials of high molecular weight. This phenomonon is shear sensitive and thus will generally exhibit itself at a given shear rate and temperature. The shear rate for the onset of melt fracture indicates the upper shear rate for processing a given material. This shear rate is used as a characterization parameter for compounds employed in extrusion processing.

The resultant neutralized sulfonated polymer has a viscosity at 0.73 sec$^{-1}$ at 200° C. of at least about $10^4$ poise, more preferably of at least about $5 \times 10^4$ poise and most preferably at least about $10^5$ poise. Higher viscosity sulfonated polymers can be employed, however, the solutions prepared therefrom will have higher solution viscosities.

The metal sulfonate containing thermoplastic polymers at the higher sulfonate levels possess extremely high melt viscosities and are thereby difficult to melt process. The addition of ionic group plasticizers markedly reduces melt viscosity and frequently enhances physical properties.

These preferential plasticizers are selected from the group consisting essentially of carboxylic acids having about 5 to about 30 carbon atoms, more preferably about 8 to about 22 carbon atoms, or basic salts of these carboxylic acids wherein the metal ion of the basic salt is selected from the group consisting essentially of aluminum, iron, antimony, lead or Groups I-A, II-A, I-B or II-B of the Periodic Table of Elements and mixtures thereof. The carboxylic acids are selected from the group consisting essentially of lauric, myristic, palimitic, or stearic acids and mixtures thereof. The basic salts of these carboxylic acids include zinc stearate, magnesium stearate or zinc laurate.

The preferential plasticizer is incorporated into the neutralized sulfonated thermoplastic polymer at about 0 to about 60 parts per hundred by weight based on 100 parts of the sulfonated polymer, more preferably at about 5 to about 40, and most preferably at about 7 to about 25. The metallic salt of the fatty acid can also be used as neutralizing agent. In the case of the neutralizing agent and plasticizer being the identical chemical species, additional metallic salt is added over the required levels of neutralization. Alternatively, over preferential plasticizers are selected from organic esters, trialkyl phosphates, alcohols, amines, amides, ureas, ammonium and amine salts of carboxylic acids and mixtures thereof. The preferred plasticizers are selected from fatty acid or metallic salts of fatty acid and mixtures thereof. The resultant neutralized sulfonated thermoplastic polymer with preferential plasticizer is isolated from the solution by techniques commonly employed in the polymer industry; i.e., coagulation, steam stripping, solvent stripping, etc. Alternatively, it may be attractive to employ the solutions of the neutralized sulfonated polymer directly as a spinning solvent or to dilute or concentrate it to a suitable viscosity range.

The isolated dried crumb of the neutralized sulfonated polyvinyl aromatic type polymer, which can also be plasticized, is dissolved in a suitable solvent to form a solution for the subsequent process of forming the fibers. The concentration of the neutralized sulfonated thermoplastic polymer in the solution is about 5 to about 50 grams per hundred ml. of the mixed solvent, more preferably about 10 to about 25, and most preferably about 15 to about 25, wherein the resultant Brookfield viscosities of the solutions at 6 rpm at room temperature are about 1,000 to about 200,000 cps, more preferably about 2,000 to about 50,000, and most preferably about 5,000 to about 25,000. The mixed solvent is formed from a backbone solvent which solvates the backbone of the sulfonated thermoplastic polymer and a polar cosolvent (or simply polar solvent) which solvates the ionic groups of the sulfonated thermoplastic polymer, wherein the backbone and polar cosolvents should be mutually miscible with each other. The backbone solvent is selected from aromatic, aliphatic or cycloaliphatic type solvents such as toluene, benzene, or xylene, cyclohexane, heptane, decane, hexane, etc. and mixtures thereof. The polar cosolvent is selected from the group consisting of aliphatic and cycloaliphatic alcohols, such as methanol, ethanol, isopropanol, n-propanol, n-butanol, i-butanol, n-pentanol, isopentanol, isohexanol, n-hexanol, methyl cyclohexanol or cyclohexanol and mixtures thereof. The selection of these respective solvents and their relative amounts is an important aspect of this improved process for preparing the fibers. The first solvent which comprises the major portion of the polymer solution is one which primarily solvates the polymer backbone and therefore can be termed the backbone solvent. It is a requirement that the polymer backbone prior to sulfonation be soluble in the backbone solvent. Solubility is determined by dissolution of 1 gram of polymer in 100 ml. of solvent. If 95% or more of the polymer dissolves, the polymer is deemed to be soluble in that solvent. Crystalline polymer requires dissolution at elevated temperature as described above. Temperatures of 70° to 100° C. are usually adequate. For example, if 1 gram of polystyrene is tested for solubility in toluene, it is observed that the polymer substantially dissolves. Therefore, toluene represents an acceptable solvent for this polymer. Upon sulfonation and neutralization, it is generally observed that the sulfonated, neutralized polymer will not dissolve in a hydrocarbon solvent (such as toluene) or mixtures of such solvents or if dissolution occurs the solution viscosities will be so high at the desired polymer level that the polymer solutions are extremely difficult to handle.

We have observed that the addition of a suitable polar cosolvent will permit the dissolution of these sulfonated, neutralized thermoplastic polymers to yield solutions which are substantially gel free and which possess solution viscosities in a very desirable range for spinning fibers. Furthermore, such solutions can contain high solids levels, for example, up to and exceeding 15 wt. % sulfonated polymer which is extremely desirable in such spinning operations.

It is apparent that the type and level of the polar solvent is very important in the practice of this invention. First, it must contain a suitable polar function such as an alcohol, ester, acid, amine or similar polar group. Second, this polar solvent must interact primarily with the ionic groups of the sulfonated polymer so as to dissociate them to a substantial extent. Third, this polar solvent must be miscible with the backbone solvent at the levels employed in the spinning process, i.e., it should not comprise a second phase which is immiscible with the primary solvent. This latter requirement can be established simply by adding the candidate polar solvent to the backbone solvent at the desired level and determining that the solvent pair is indeed miscible.

The amount of polar cosolvent required depends on the amount of polymer to be dissolved, its sulfonate content, the choice of backbone solvent employed, and on the structure of the polar solvent. Generally, the polar solvent will be present at levels ranging from about 2 wt. % (based on the combined weights of polar cosolvent and backbone solvent) to about 30 wt. %, preferably from about 3% to about 20% and most preferably from about 4% to about 15%.

An excellent solvent combination is a combination of toluene and methanol with the former being a backbone solvent and the latter the polar solvent. If insufficient methanol is added, the sulfonated polymer will not dissolve. If too much methanol is incorporated then it can act as a precipitant for the polymer backbone. Therefore, for example, a 70/30 toluene/methanol combination should not be employed because in the case of sulfonated polystyrene it will not form a true solution in this mixture. On the other hand, the use of other alcohols such as phenylethanol permits their incorporation at a relatively higher level because they are more compatible with the polymer backbone.

Methanol is a highly preferred polar cosolvent because it interacts very strongly with the ionic groups and serves to decrease polymer solution viscosity most effectively even when present at low levels. Also, it is inexpensive and readily available. Other alcohols such as ethanol and isopropanol are also preferred polar solvents.

Even the combination of a backbone solvent and a preferred polar solvent may not be an acceptable solvent combination. For example, the selection of decane and methanol is not a desirable pair because of the limited miscibility of methanol with decane. Alternatively, the use of hexanol-decane or isopropanol-decane provides very acceptable combinations for a polyolefin based polymer. Therefore, those skilled in the art, who follow these teachings, can readily determine the appropriate solvent mixtures that meet the requirements delineated above.

It is observed in the case of sodium sulfonated polystyrenes of moderate sulfonate content (less than 6 mole %) that homogeneous solutions can be prepared employing only a single solvent provided that solvent is strong enough to perform both functions of solvating both the backbone and the ionic groups. Relatively few solvents are capable of doing this; however, we have found that tetrahydrofuran and dimethyl formamide are effective in this regard. Therefore, these solvents can be employed to dissolve the sulfonated polystyrenes and spin suitable fibers in the absence of additional cosolvents.

Additionally, various additives can be incorporated into the compositions for modification of various properties, wherein the additives are selected from the group consisting of lubricants, a metallic hydroxide, fillers, oils, pigments or stabilizers. If the additive is a liquid, it can be ideally added to the cement of the neutralized sulfonated thermoplastic polymer prior to isolation by steam stripping. If the additive is a solid, it can be added to a crumb of the sulfonated thermoplastic polymer by compounding in an intensive mixing device such as a Banbury, a Farrell Continuous Mixer, a compounding extruder, or on a two-roll mill.

For example, a filler can be incorporated into the composition for modification of the modulus of the fiber as well as altering the surface shine.

The fillers employed in the present invention are selected from carbon blacks, talcs, ground calcium carbonate, water precipitated calcium carbonate, or delaminated, calcined or hydrated clays and mixtures thereof. Examples of carbon black are lamp, channel, furnace or acetylenic blacks. These fillers are incorporated into the blend composition at about 1 to about 50 parts per hundred, more preferably at about 1 to about 25 and most preferably at about 2 to about 10.

These fillers must be selected so as to be properly suspended in the polymer solution prior to spinning the elastomeric fibers. Therefore, the particle size must be such that the particles do not readily settle out during the solution spinning process. Therefore, the preferred filler size is from about 0.03 to about 10 microns. Some typical fillers are shown in Table I.

TABLE I

| Filler | Code # | Oil Absorption grams of oil/100 grams of filler | Specific Gravity | Avg. Particle Size Micron | pH |
|---|---|---|---|---|---|
| calcium carbonate ground | Atomite | 15 | 2.71 | | 9.3 |
| calcium carbonate precipitated | Purecal U | 35 | 2.65 | .03–.04 | 9.3 |
| delaminated clay | Polyfil DL | 30 | 2.61 | 4.5 | 6.5–7.5 |
| hydrated clay | Suprex | | 2.6 | 2 | 4.0 |
| calcined clay | Icecap K | 50–55 | 2.63 | 1 | 5.0–6.0 |
| magnesium silicate (talc) | Mistron Vapor | 60–70 | 2.75 | 2 | 9.0–7.5 |

Selected oils or backbone plasticizers can be employed in the present invention to modify the fiber and develop different properties, wherein the oils are relatively non-volatile materials compatible with the polymer backbone.

These backbone plasticizers are best employed with the polyvinylaromatic based thermoplastic systems. Here such plasticizers such as didecyl phthalate, dioctylphthalate, dibutyl phthalate, dihexylphthalate, etc. will solvate the polyvinylaromatic backbone and provide a flexible material well suited to fiber applications. A list of such agents is provided in U.S. Pat. No. 3,870,841 which is incorporated herein by reference.

Such plasticizers or oils for the polymer backbone typically are not employed for the crystalline polyolefins because the latter polymers crystallize, the oils exude from the polymers and therefore are not compatible.

A lubricant can be employed in the blend composition at a concentration level of about 0 to about 20 parts per hundred based on 100 parts of the neutralized sulfonated thermoplastic polymers, and most preferably about 0 to about 15. The lubricants of the present instant invention of use with the crystalline polyolefins are non-polar paraffinic hydrocarbon waxes having a softening point of about 135° F. to about 200° F., more preferably 150° F. to 200° F., wherein the wax has a number average molecular weight of about 1000 to about 4000, more preferably 1500 to 3500, and less than 2 wt. % polar constituents. Additionally, amorphous polypropylene can be used as a lubricant. These lubricants can be useful but are not essential to the solution spinning procedure employed.

Zinc oxide can be incorporated into the composition as a whitening pigment as well as suitable filler to modify the ionic bonding force between the sulfonate groups in the sulfonated polymer. The zinc oxide is incorporated into the composition at a concentration level of about 0 to about 10 parts per hundred by weight based on 100 parts of sulfonated polymer, more preferably about 0 to about 5. Alternatively, a Rutile or Anatase titanium dioxide can be employed as a whitening pigment.

The solution of the neutralized sulfonated polyvinyl aromatic polymer is extruded through a suitable fiber forming die into the resultant fiber by either a conventional wet spinning or dry spinning method. The dry spinning process is preferred. For example, the solution is fed through a spinner having a plurality of orifices which is submerged in a water coagulating bath. The formed fibers after passing through the water bath are passed to a rubber glass godet, through a heated glycerine stretch-bath, over a draw godet and onto a Winder. Alternatively, in the dry process, the spun fibers extruding from the spinner can flow vertically downwardly through heated air and be collected on a Winder.

In the case of neutralized sulfonated polyolefinic thermoplastic polymers, they are formed into ionomeric fibers by hot extrusion through a mono- or multi-filament die.

DESCRIPTION OF THE PREFERRED EMBODIMENTS

EXAMPLE 1

A sample of sulfonated polystyrene was prepared following the procedures set out in U.S. Pat. No. 3,870,841. Sample A had a sodium sulfonate content of about 2.8 mole % based on sulfur analysis.

EXAMPLE 2

Solutions of the polymer Sample A were prepared for spinning by dissolving 20 to 30% by weight of the polymer in tetrahydrofuran at room temperature. The solutions were then heated to about 50° C. in a water bath and stored at room temperature for 1–3 days to allow entrapped air to escape.

Wet Spinning

Fibers were wet spun with pilot-scale spinning equipment. In this equipment the polymer solution was forced by nitrogen pressure from a 500-ml stainless-steel feed reservoir to a pump which pumped the solution through a filter pack and then through a spinneret submerged in a water coagulating bath. From the spinneret the yarn passed through a 34-in.-long coagulating bath to a ribbed glass godet, through a 23-in.-long heated glycerine stretch-bath, over a draw godet, and to a Winder.

The fiber properties for these fibers and others in the Example were measured as follows:

a. Denier

The denier of most fibers and yarns was determined by weighing a 90 cm length on an analytical balance and then calculating the weight in grams of 9,000 meters. With some fibers the denier was determined by measuring the diameter of the filaments with a microscope and then calculating the denier from knowledge of the density.

b. Tensile properties

The tenacity and elongation at break of the fibers and yarns were determined from the stress-strain curves recorded as specimens were broken on a Model TMS Instron tester. A 3-in. gauge length and a crosshead speed of 2 in./min were used.

c. Tensile factor

The tensile factors of the fibers were calculated as the product of tenacity and the square root of elongation at break. The significance of the tensile factor is discussed by A. J. Rosenthal, *Textile Res. J.*, 36, 593–602 (1966).

Three solutions of Sample A were prepared in tetrahydrofuran containing 20, 25 and 30% by weight of polymer. These solutions possessed viscosities of about 4,000, 30,000 and 60,000 cps respectively. A solution of about 30,000 cps appeared to be most satisfactory for wet spinning experiments. This polymer solution was then wet spun using a spinneret having 100 orifices 3 mils in diameter. The polymer was fed through the spinneret and the resulting yarn passed over the first godet at a rate of 6.25 meters/min and drawn 10 times as it passed through a glycerine bath at about 150° C. to a draw godet at a speed of 62.5 meters/min. This yarn was 125 denier and possessed 0.7 g/d tenacity with 3% elongation at break.

EXAMPLE 3

A series of experiments were conducted employing a dry-spinning process with polymer Sample A. In this case a solution with a viscosity of about 184,000 centipoises was spun through a spinneret having 16 orifices about 12 mils in diameter. The fibers flowed through air and were collected, then suspended in air for several hours. The filaments were then drawn by suspending them in an air circulating oven at 100° C. and 150° C. with weight attached. The denier, tenacity and elongation at break of the drawn fibers are shown in Table II.

TABLE II

| | Properties of Drawn Dry Spun Fibers | | | | | |
|---|---|---|---|---|---|---|
| Sample | Draw temp °C. | Draw ratio | Denier | Tenacity g/d | Elongation at break, % | Tensile factor |
| (a) | 100 | 2.3 | 146 | 0.6 | 2.0 | 0.9 |
| (b) | 100 | 3.7 | 101 | 0.7 | 2.3 | 1.1 |
| (c) | 150 | 2.6 | 162 | 0.8 | 3.3 | 1.5 |
| (d) | 150 | 3.2 | 114 | 1.1 | 6.0 | 2.7 |
| (e) | 150 | 3.5 | 114 | 1.0 | 5.2 | 2.3 |
| (f) | — | 0 | 660 | 0.2 | 1.5 | 2.5 |

The data in Table II clearly show the improved physical properties which are obtained with drawn fibers and how drawing the fibers at the higher temperatures improves such systems even further.

Since many modifications and variations of this invention may be made without departing from the spirit or scope of the invention thereof, it is not intended to limit the spirit or scope thereof to the specific examples thereof.

What is claimed is:

1. An improved process for forming a fiber by passing a solution of a neutralized sulfonated thermoplastic polymer through a spinneret having a plurality of orifices, said sulfonated thermoplastic polymer having about 10 to about 100 meq. of neutralized sulfonate groups per 100 grams of said neutralized sulfonated thermoplastic polymer, said neutralized sulfonated thermoplastic polymer being formed from a thermoplastic polymer selected from the group consisting of polystyrene, poly-t-butyl-styrene, polychlorostyrene, polymethylstyrene and co- and terpolymers with acrylonitrile and vinyl toluene, a cation of said neutralized sulfonate groups being selected from the group consisting of aluminum, antimony, lead and Groups IA, IIA, IB and IIB of the Periodic Table of Elements, wherein the improvement consists essentially of dissolving said neutralized sulfonated thermoplastic polymer in a solvent system to form said solution, said solvent system being formed from a blend of a first solvent and a second solvent, said first solvent being an aromatic solvent which primarily solvates a hydrocarbon backbone of said neutralized sulfonated thermoplastic polymer, said second solvent being selected from the group consisting of $C_1$ to $C_7$ aliphatic and cycloaliphatic alcohols, said second solvent solvating ionic groups of said neutralized sulfonated thermoplastic polymer, said first solvent comprising about 60 to about 98 vol. % of said mixed solvent, said neutralized sulfonated thermoplastic polymer being at a concentration level of about 5 to about 50 grams per 100 ml. of said solvent system, said solution having a Brookfield viscosity at room temperature and 6 rpm. of about 1,000 to about 200,000 centipoises.

2. An improved process according to claim 1, further including adding an ionic plasticizer at a concentration level of at least about 3 parts by weight based on 100 parts of said neutralized sulfonated thermoplastic polymer.

3. An improved process according to claim 1, further including adding an additive to said neutralized sulfonated thermoplastic polymer at a concentration level of less than about 60 parts by weight based on 100 parts of said neutralized sulfonated thermoplastic polymer.

4. An improved process according to claim 3, wherein said additive is selected from the group consisting of oils, fillers, pigments, a metallic hydroxide or stabilizers and mixtures thereof.

* * * * *